July 2, 1940.  A. G. ZIMMERMAN  2,206,381
FILM MAGAZINE
Filed Oct. 31, 1938
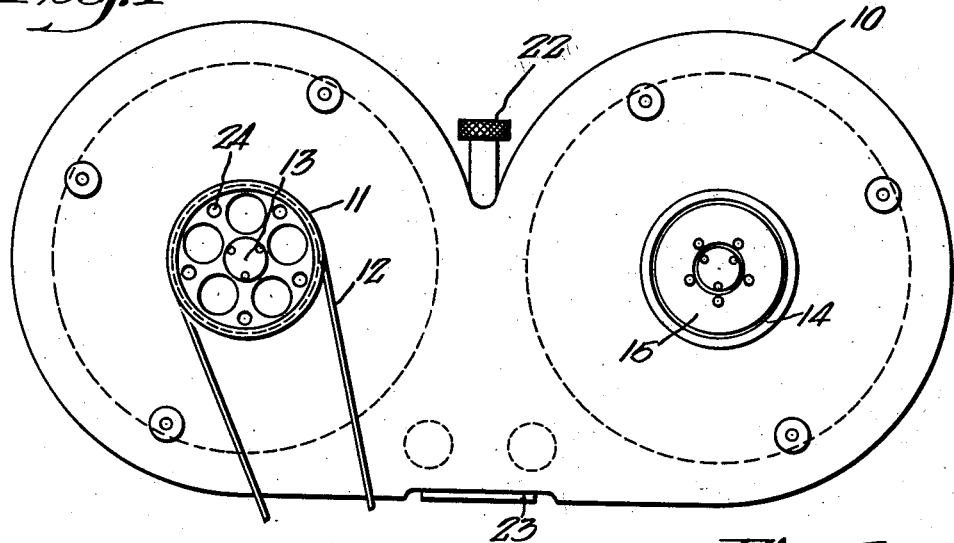
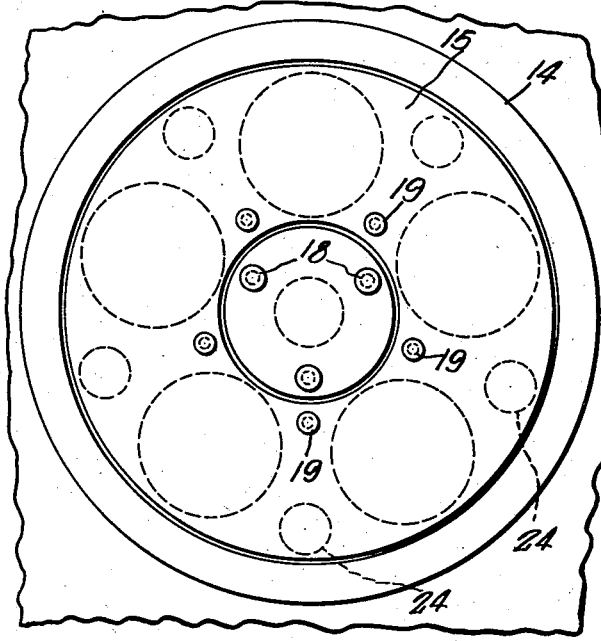
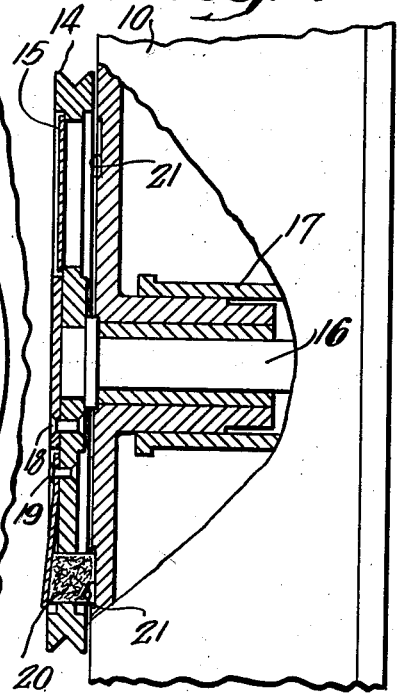
Inventor
Arthur G. Zimmerman
By
Attorney Patented July 2, 1940

2,206,381

UNITED STATES PATENT OFFICE 2,206,381

FILM MAGAZINE

Arthur G. Zimmerman, Indianapolis, Ind., assignor to Radio Corporation of America, a corporation of Delaware Application October 31, 1938, Serial No. 237,970

3 Claims. (Cl. 242—55)

This invention relates to an improved film magazine and more particularly to an improved brake structure for use on the let-off reel of a film magazine.

In the motion picture art it is customary to provide film magazines for use on cameras and sound recorders which are adapted to receive a roll of approximately one thousand feed of unexposed film and to permit this film to pass through the camera onto a spindle in the magazine which takes up the film after exposure. Both the roll of unexposed film and the take-up spindle are mounted in a unitary light-tight case which may be bodily removed from the camera and another case substituted therefor. Similar film magazines are used in conjunction with photophonographic sound recorders.

In the case of a motion picture camera, the film is fed over a sprocket and is then pulled intermittently past the exposure aperture whereas in a sound recorder the film may be fed over a sprocket and is thereafter fed at a uniform speed past the sound recording point. These sound recorders are often driven by synchronous motors and when the apparatus is started a very sudden jerk is applied to the film tending to cause the film from the roll to overrun due to its momentum and sometimes kink and jam in the magazine or the sound recorder. In addition to this, if the roll of film is permitted to rotate freely it has a tendency to move forward at a higher velocity than required and then to stop until the slack produced is taken up when the sudden tightening of the film causes it to again overrun. These irregularities in motion react upon the film passing through the sound recorder and produce corresponding irregularities in the sound record.

In order to avoid these irregularities in the sound record, I have provided a novel type of brake for application to the spindle carrying the roll of unexposed film which maintains this film under a slight but substantially uniform tension. This brake is adapted to be attached to the usual commercial type of film reels and is of such construction as to give very uniform action of the brake over a long period of time without adjustment.

One object of the invention is the provision of an improved brake for a film magazine.

Another object of the invention is the provision of a brake for a film magazine which can be attached externally of the magazine.

Another object of the invention is the provision of a brake for a film magazine which can be attached thereto without interfering with the normal functions or operation of the magazine.

Other and incidental objects of my invention will be apparent to those skilled in the art from a reading of the following specification and an inspection of the accompanying drawing, in which Figure 1 is a rear view of a film magazine having my improved brake attached to the let-off spindle thereof, Figure 2 is an enlarged elevation of the brake magazine, and Figure 3 is a section through the brake magazine and through a portion of the magazine showing the details of the construction thereof.

Referring, first, to Fig. 1, the usual film magazine is provided with a light-tight casing 10, having a screw 22 thereon for attaching it to a camera or sound recorder. The unexposed film is wound upon a core 17 within the magazine and is customarily located in the portion of the magazine appearing at the right-hand side in Fig. 1. The film from the roll passes down through the light trap indicated at 23 to the camera or recording device and, after exposure, passes again through the light trap to a core 25 carried upon the take-up spindle 13 in the other portion of the magazine. The take-up spindle 13 is driven by a pulley 11 which, in turn, is driven by an appropriate belt 12. On the let-off side of the magazine a shaft 16 is provided to carry the core 17 and this shaft 16 is provided with a pulley 14 similar to the pulley 11. This pulley is sometimes used to rewind a portion of the film if a second exposure is to be made thereon or to wind film into the magazine.

I make use of this pulley 14 in conjunction with my improved brake by building the brake mechanism onto the pulley 14 without any material modification thereof. The pulley 14, like the pulley 11, is provided with a number of small holes 24. In each, or as many as desired of these holes 24, I insert a felt plug 20 of substantially the same diameter as the hole and long enough to reach through the pulley and extend some distance on each side thereof. In the casing 10 of the film magazine I turn a groove 21 in order to provide a smooth, accurate surface with which the felt plugs 20 may contact. A circular resilient member 15 is provided. This member 15 is preferably made of thin spring brass but may be of any other appropriate resilient material. As shown in Fig. 3, the plate 15 is fastened to the wheel 14 by appropriate rivets 19 and the wheel 14 is secured to the hub by the rivets 18. The spring member 15 is raised slightly as shown in the bottom portion of Fig. 3 by the felt plugs 20 and correspondingly exerts pressure against the felt plugs pressing them into the groove 21.

By the use of felt plugs in each of the holes, making a total of five plugs, a very uniform braking action is secured preventing any irregularity in the manner in which the film is permitted to run from the roll.

Having now described my invention, I claim:

1. In combination with a film magazine having at least two film spindles therein a pulley on each of said spindles and having also a circular brake path on its side concentric with one of said spindles, a brake on one of said pulleys, said brake including a plurality of yieldable brake members passing through holes in said pulley into contact with said brake path and a sheet of resilient material secured to the surface of said pulley and urging said brake members through said pulley toward said magazine.

2. A let-off brake for a film magazine, including a pulley, a plurality of spaced felt brake members passing through apertures in said pulley, and a sheet of spring material secured to said pulley and urging said felt members through said apertures.

3. A let-off brake for a film magazine, including a pulley, a plurality of uniformly spaced felt brake members passing through apertures in said pulley, and a sheet of spring metal secured to said pulley and urging said felt members through said apertures into engagement with the surface of said magazine.

ARTHUR G. ZIMMERMAN.